Sept. 25, 1973 V. W. KIMBLE 3,761,341
APPARATUS FOR GUIDING A STRIP TO A SUPPORT SURFACE
Filed April 12, 1971 5 Sheets-Sheet 1
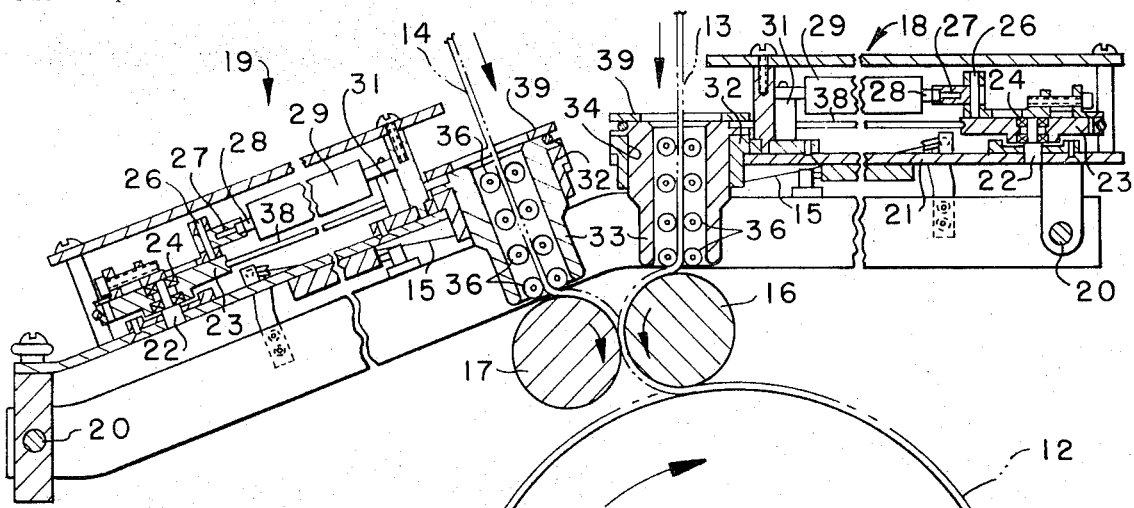
FIG.-2-
FIG.-1-
INVENTOR.
VICTOR W. KIMBLE
BY
ATTORNEY

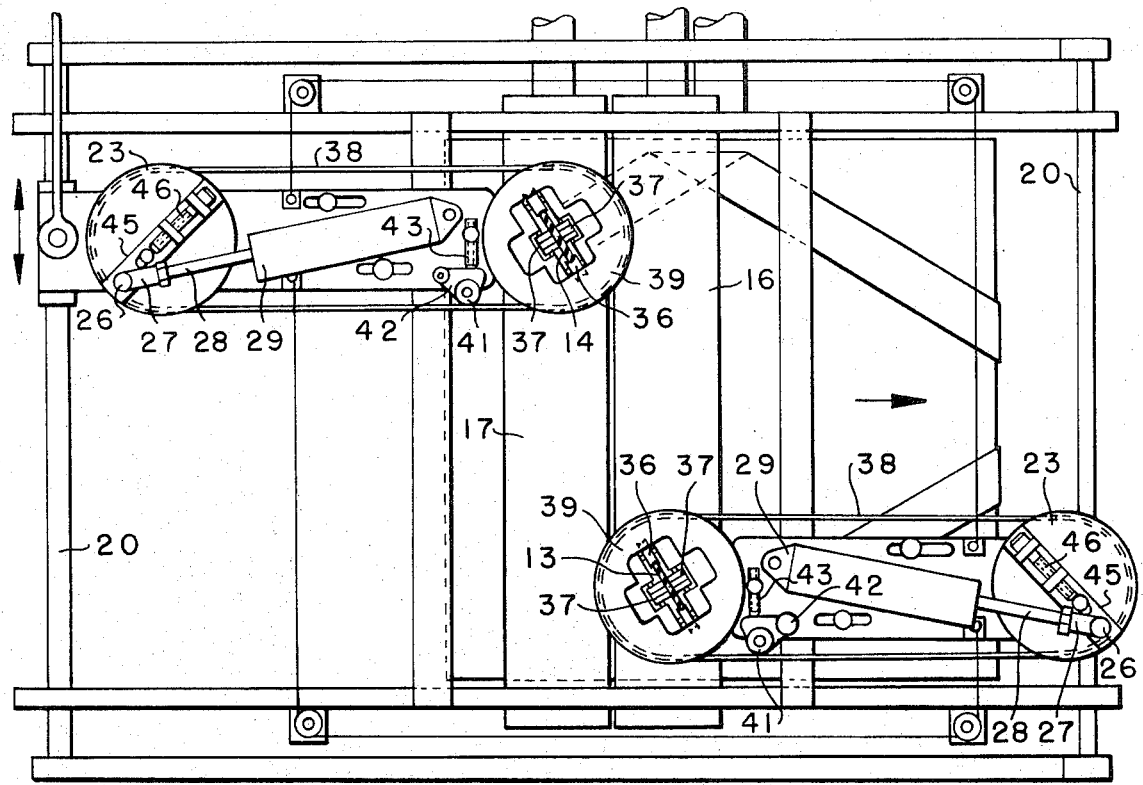
FIG.-3-
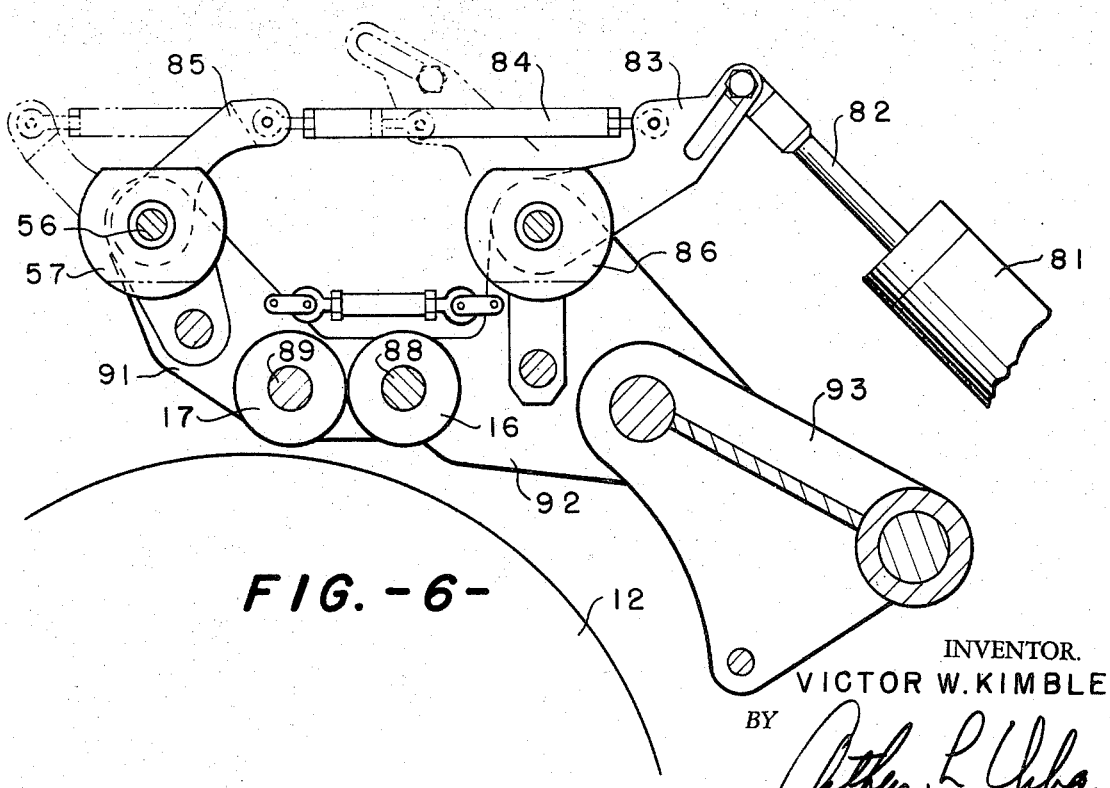
FIG.-6-

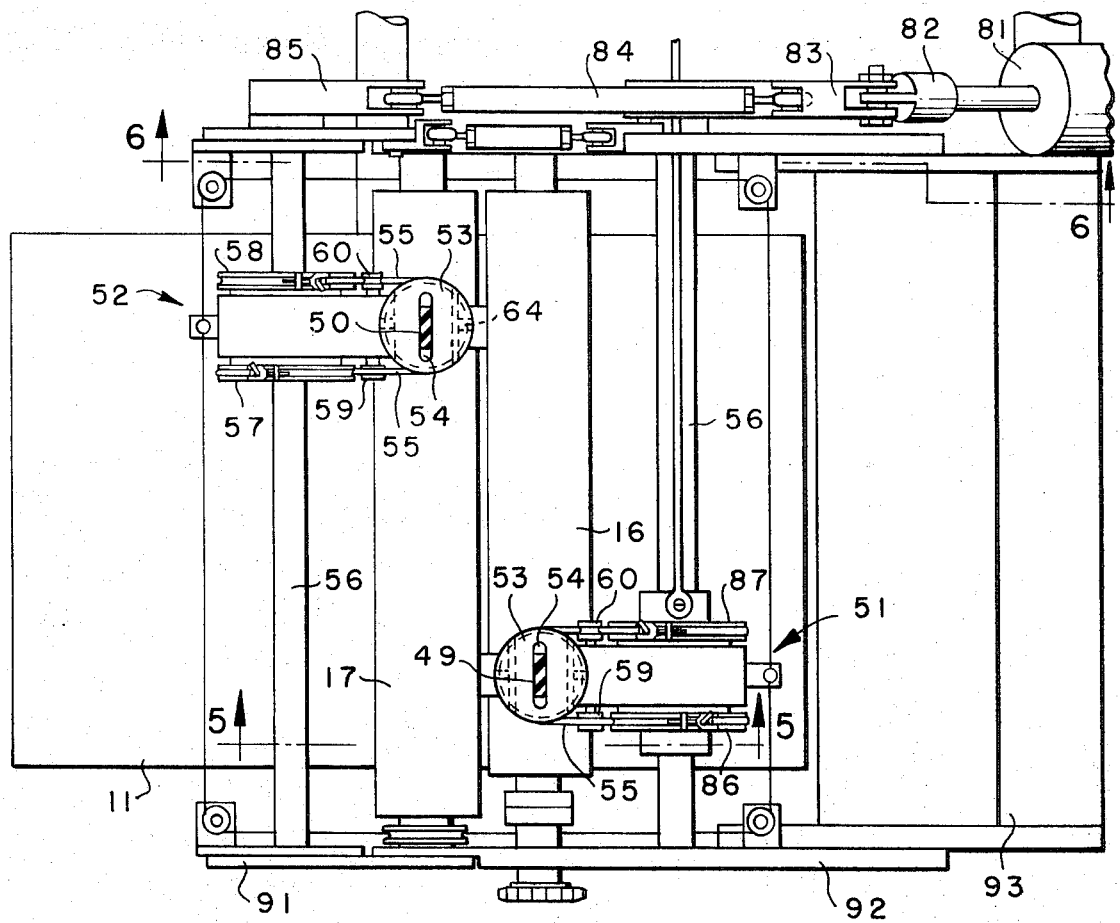
FIG.-4-
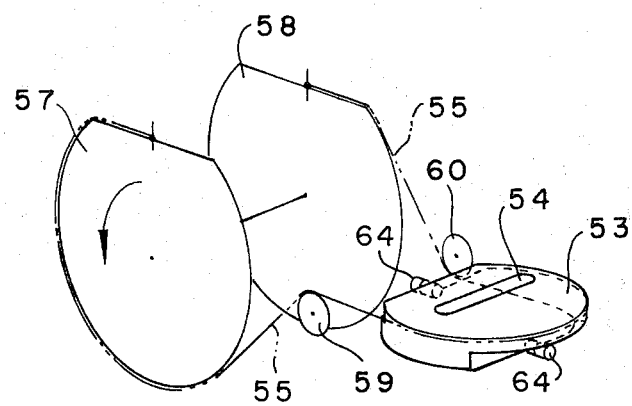
FIG.-7-

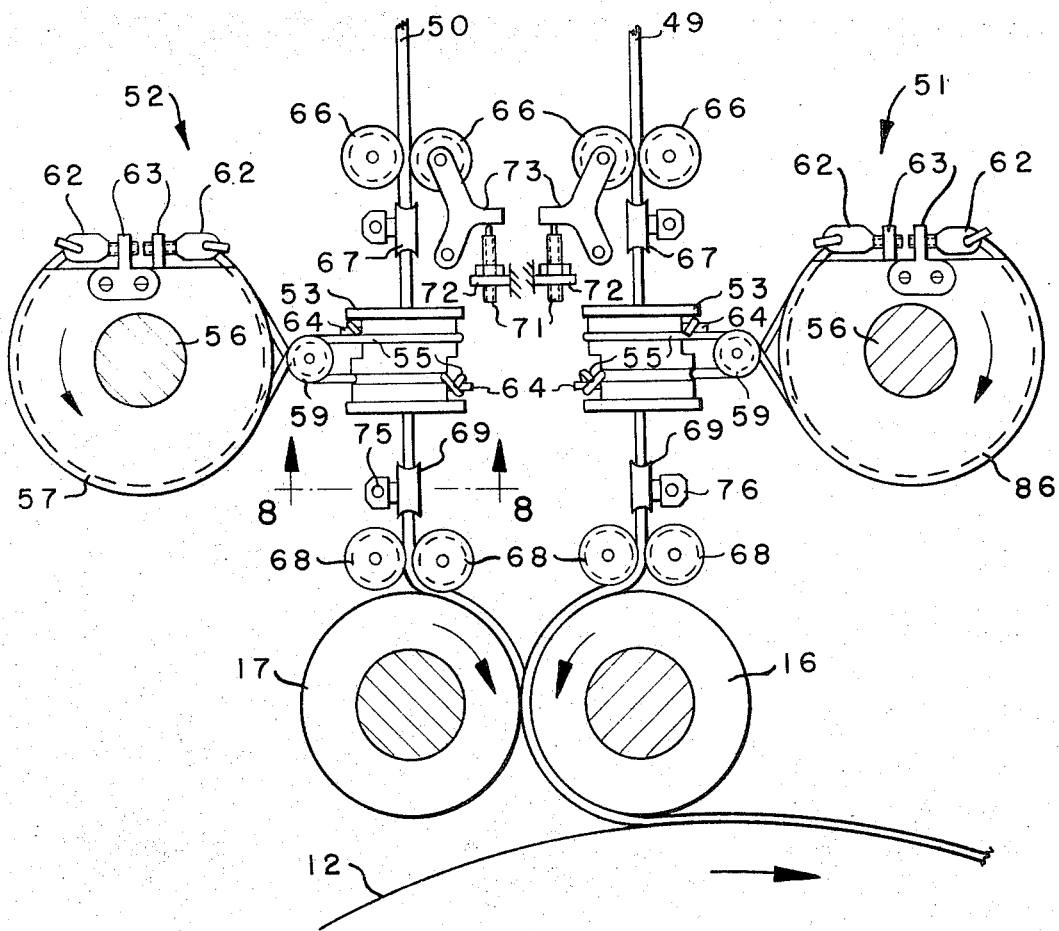
FIG.-5-
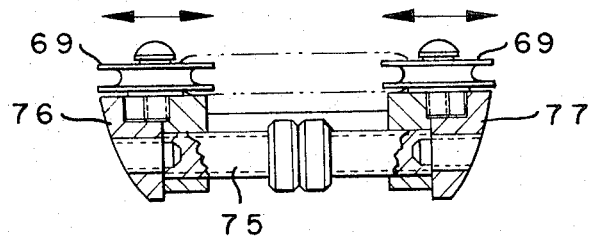
FIG.-8-

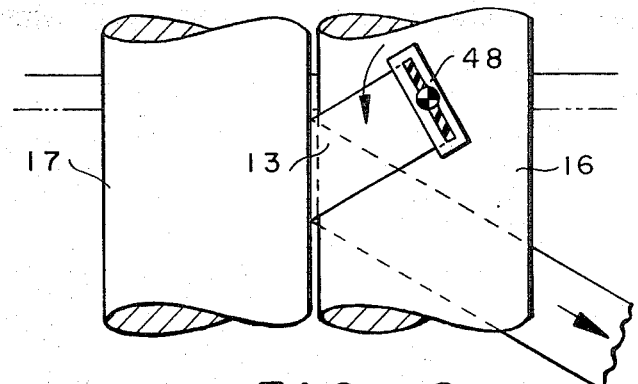
FIG.-9-
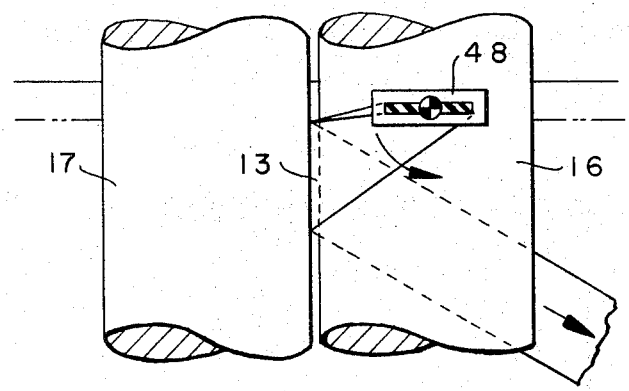
FIG.-10-
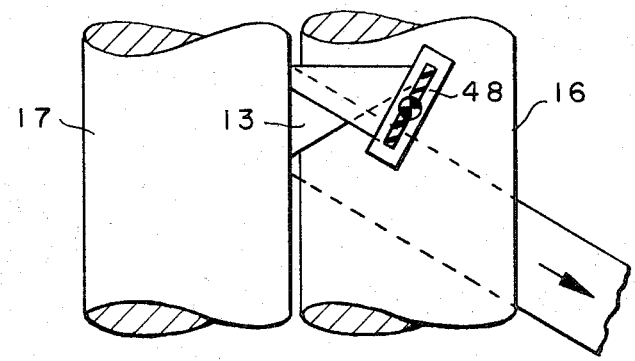
FIG.-11-
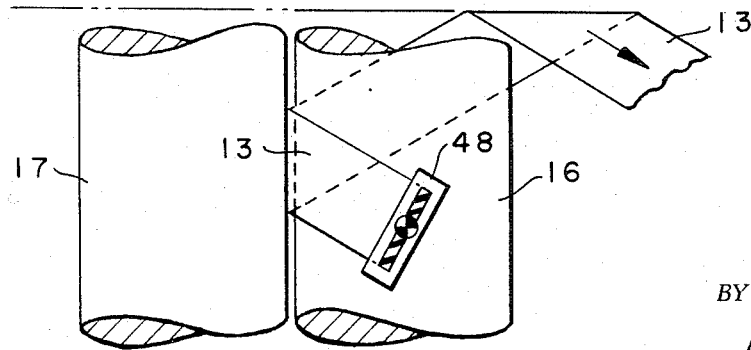
FIG.-12-

United States Patent Office 3,761,341
Patented Sept. 25, 1973

3,761,341
APPARATUS FOR GUIDING A STRIP TO A SUPPORT SURFACE
Victor W. Kimble, Spartanburg, S.C., assignor to Deering Milliken Research Corporation, Spartanburg, S.C.
Filed Apr. 12, 1971, Ser. No. 133,144
Int. Cl. B29h 9/04; B65h 81/08
U.S. Cl. 156—446                    13 Claims

ABSTRACT OF THE DISCLOSURE

Apparatus for guiding a continuous strip to a support surface including a guide member having a slot therethrough pivotably carried by a support housing, means for reducing the friction in the slot of the guide member, and means for pivoting said guide member in said support housing. Also, a novel method of producing an endless reinforcement.

---

The tire industry has shown considerable interest in tire constructions which include an annular reinforcement or belt about the periphery of the tire between the carcass and tread portions thereof. Such belted tires have better road stability and longer tread life both in radial ply and bias ply carcass constructions.

The annular reinforcements are conventionally formed of cord or wire coated with or embedded in a suitable insulating material such as rubber or other plastic material which is compatible with and has an adhesive affinity to the rubber of the tire. The cord usually is disposed in a pattern in which portions thereof extend at an angle to the longitudinal axis of the reinforcement. One such construction utilizes bias cut woven fabric which has been calendered with a layer of unvulcanized rubber. Also, it has been proposed to form reinforcements by winding one or more cords or strips onto a rotating drum while employing a reciprocating guide to lay the cord or cords in a generally zigzag pattern thereon. Examples of such belts are disclosed in U.S. Pats. Nos. 2,982,327 and 3,442,874. One of the considerations in the design of the reinforcement is the minimizing of lateral forces in tires due to the pattern of the outermost layer of the belt. This effect is observed when tires are mounted on a vehicle or on a test wheel under load. These lateral forces create vibrations in the vehicle on which the tires are mounted and in the tire itself, thus reducing the life of the tire and causing vehicle handling problems. Thus, the cord or strip must be wound in a preselected pattern with a high degree of precision to avoid inaccuracies which could result in the creation of lateral forces in the tire.

The present invention provides a novel apparatus and method for producing an endless tire reinforcement with a high degree of pattern accuracy. Furthermore, the invention provides a new apparatus and method for accurately guiding and positioning a plurality of unitary strips on a support surface in a desired pattern.

Other advantages and benefits of the invention will be apparent from the following detailed discussion and description of the drawings in which:

FIG. 1 is a schematic illustration of one form of apparatus of the invention for forming an endless reinforcement;

FIG. 2 is an enlarged side elevation partially in section of the guide and transfer roll portions of the apparatus shown in FIG. 1;

FIG. 3 is a top view of the apparatus shown in FIG. 2 with the left guide assembly raised to a horizontal position for clarity;

FIG. 4 is a top view of another form of guide apparatus of the invention;

FIG. 5 is an enlarged sectional view taken along line 5—5 of FIG. 4;

FIG. 6 is an enlarged sectional view taken along line 6—6 of FIG. 4;

FIG. 7 is a schematic illustration of the guide rotating mechanism shown in FIG. 5;

FIG. 8 is an enlarged sectional view taken along line 8—8 of FIG. 5; and

FIGS. 9–12 are enlarged schematic top views of a portion of the guide member of the invention illustrating a sequence in the operation thereof.

As shown in the drawings, apparatus for guiding the positioning unitary strips or ribbons on a support surface includes a rotatable winding drum 11 having a generally cylindrical outer surface 12 providing a support surface for cord strips 13 and 14 to be positioned thereon. Associated with drum surface 12 are rolls 16 and 17 and guides 18 and 19 mounted for reciprocation on rods 20. Guides 18 and 19 are interconnected by a cable and pulley arrangement 15.

Guide 18 includes a base plate 21 (FIG. 2) with a pulley 23 mounted thereon for rotation on shaft 22 through bearings 24. Affixed to pulley 23 near the periphery thereof is a pin 26 which engages clevis 27 of piston rod 28 of air cylinder 29. Cylinder 29 is connected to base plate 21 through a bracket 31. To the end of plate 21 is affixed a guide housing 32 which rotatably supports a guide member 33 on bearing surface 34. A plurality of guide pulleys 36 are disposed within guide member 33 and spaced to provide an opening through the guide member. As shown in FIG. 3, roller bearings 37 are positioned quadrantally from the pulleys 36 and spaced from each other. Thus, the pulleys 36 are positioned so that the peripheral surfaces thereof are adjacent to the edges of strip 13 and the roller bearings 37 are disposed adjacent to the major surfaces of the strip. This arrangement of the pulleys 36 and bearings 37 provides a low friction path through the guide member.

As shown in FIG. 3, a continuous cable 38 is wrapped around pulley 23 and the upper portion of guide 33. The cable is maintained in proper position around guide 33 by a cover 39. The tension in cable 38 is adjustable by moving wheel 41 mounted on rotatable bracket 42 against the cable. Adjustment is achieved by rotation of screw 43. The amount of rotation of the guide member 33 can be varied by adjusting screw 46 which moves slide 45 to which pin 26 is affixed with respect to pulley 23.

Guide 19 is similar in construction to guide 18 and operates therewith when two strips are employed.

Another form of apparatus of the invention for guiding and positioning unitary strips or ribbons on a support surface is shown in FIGS. 4–8 of the drawings. Disposed above rolls 16 and 17 are guides 51 and 52 mounted for reciprocation on torque transmission shafts 56. Each of the guides is similar in design and includes a guide member 53 having a slot 54 therethrough. A guide member 53 is mounted for rotation about the axis of the slot. Rotation is effected through a cable 55 disposed about a portion of the periphery of guide member 53 with the ends of the cable extending and being affixed to a pair of rotatable pulleys 57 and 58. Interposed between the guide member 53 and the pulleys 57 and 58 are pulleys 59 and 60. The ends of the cable 55 are affixed to adjustment screws 62 threaded into brackets 63 to provide control of the tension in the cable. The cable is secured to a pair of studs 64 extending from the periphery of guide member 53, to prevent slippage between the guide member 53 and the cable 55.

The position of the strip in the guide slot 54 is maintained by rolls and pulleys disposed above and below the guide slot. Thus, a pair of rolls 66 is located above the guide member 53 on each side of the strip with a pair of pulleys 67 engaging each edge of the strip. In the same way a pair of rolls 68 is disposed on each side of the strip below the guide member 53 and a second pair of pulleys 69 contact each edge of the strip. The spacing between the rolls and the pulleys can be varied to accommodate strips of different dimensions. As shown in FIG. 5, this can be accomplished with rolls 66 by movement of adjustment screw 71 in threaded bracket 72. Since the end of screw 71 bears against pivotable bracket 73 on which one of the rolls 66 is mounted, movement of the screw 71 will change the spacing between the rolls 66. A similar mechanism (not shown) can be used to control the spacing between rolls 68. The spacing between the edge of pulleys 69 may be changed as shown in FIG. 8 by adjustment of screw 75 which is disposed between supports 76 and 77 on which pulleys 69 are mounted.

The second guide 51 is of the same design as guide 52 with a guide member 53, a cable 55 and cable pulleys 86 and 87. Actuation of cable pulleys 86 and 87 is effected through a cylinder 81 (FIG. 6), the rod 82 of which is connected through suitable linkage 83 to the pulleys 86 and 87. Link 83 is pivotably connected through a rod 84 to a bracket 85 in association with cable pulleys 57 and 58 associated with guide 52. Shafts 88 and 89 of transfer rolls 16 and 17 respectively also are pivotably connected to links 83 and 85 through suitable brackets 91 and 92. Bracket 92 in turn is pivotally connected to pivotable supporting member 93 to provide movement of the complete assembly toward and away from the drum surface 12.

The operation of the apparatus shown in FIGS. 2 and 3 of the drawings will be described with regard to guide 18. During the passage of strip 13 through the sleeve 33, the strip passes between roller bearings 37 which are adjacent to the major surfaces of the strip. At the same time the peripheral surfaces of guide pulleys 36 are adjacent to the edges of the strip.

The strip leaving the guide 18 is delivered to the surface of roll 16 and as the roll is rotated, the strip is carried by the roll into contact with drum surface 12. The strip is pressed against the surface 12 and adheres thereto as the drum 11 is rotated. Simultaneously with the delivery of the strip to roll 16, the guide 18 is moved along rod 20 and parallel to the axis of roll 16 to position succeeding portions of the strip 13 at different sections of the roll. Since, as shown in FIG. 2, the outlet of the guide is located in close proximity to the surface of the roll 16, changes in the positions of the strip on the roll can be made accurately and abruptly provided the strip has a good adhesive affinity for the roll surfaces. For example, sharp turns can be provided at the edges.

As the guide 18 moves toward the end of the roll 16, its traverse will stop and the guide will move back toward the opposite end of the roll. When a reinforcement with folded edges is being made, as the guide reaches the end of the roll, air cylinder 29 is actuated moving piston rod 28 and rotating pulley 23. Since cable 38 is secured to pulley 23, rotation of the pulley will cause the cable to move and rotate guide member 33 to which the cable is attached at the opposite end of the guide. The rotation of the guide member will result in the turning or folding of the strip as it is laid on roll 16. FIGS. 9–12 illustrate schematically a sequence of movement of the guide member which will be discussed hereinafter.

The guiding and positioning of a second strip 14 on drum surface 12 is accomplished in the manner described above for the positioning of strip 13. However, strip 14 is fed through guide 19 into contact with roll 17. Since roll 17 contacts roll 16, the rotation of roll 17 presses strip 14 onto roll 16 where contact is maintained until roll 16 presses it against the drum surface 12.

In the operation of the apparatus shown in FIGS. 4–8 of the drawings, strips 49 and 50 are guided and positioned on drum surface 12 by guides 51 and 52. As strip 49 advances to drum surface 12 it passes between rolls 66 which contact the two faces of the strip and between pulleys 67 which contact the edges of the strip. Thereafter, strip 49 passes through slot 54 of guide member 53 and between pulleys 69 which contact the edges of the strip and rolls 68 which contact the faces of the strip. Since rolls 68 are adjacent transfer roll 16, the strip first contacts roll 16 and is carried on the periphery thereof by the rotation of the roll into contact with drum surface 12.

As the guide assembly 51 is traversed along rod 56 from one end of roll 16 to the other, succeeding portions of the strip 49 are positioned at different sections of the roll which in turn places the strip portions at different points on drum surface 12. When the guide assembly 51 reaches an end of the roll, the assembly stops and moves back toward the opposite end. At the end of the traverse when a belt with folded edges is being formed, cylinder 81 is actuated moving piston rod 82 and link 83 which in turn rotates cable pulleys 86 and 87. This rotation causes cable 55 to be moved and since it is wrapped around guide member 53 the guide member 53 will be rotated about the axis of the strip slot 54. This rotation of the guide member 53 results in the turning or folding of the strip as it is laid on roll 16 and produces a fold in that portion of the strip as it is being positioned on drum surface 12. FIGS. 9–12 discussed hereinafter illustrate schematically a sequence of movement of the guide.

The guiding and positioning of a second strip 50 on drum surface 12 is accomplished in the manner described above for the positioning of strip 49. However, strip 50 after being fed through guide assembly 52 contacts roll 17 first and then is transferred to roll 16 from which it is laid together with strip 49 on drum surface 12.

One sequence of movement of the guide of the invention is illustrated in FIGS. 9–12 with only the strip slot 48 portion of the guide being shown. In FIG. 9, strip 13 is positioned on roll 16 at an angle to the axis of the roll with the slot 48 perpendicular to the path of the strip even though the guide itself is moving along a line parallel to the axis of roll 16. As the slot 48 reaches the end of its traverse the guide is rotated changing the position of slot 48 (shown in FIG. 10 as a counterclockwise rotation). The pivot point of the slot is shown as sectioned circle in the drawings. FIG. 10 illustrates the beginning of a fold of the strip back on itself in the portion of the strip closest to the slot. This folding is about an axis substantially radial of the drum surface. Further rotation of the slot 48 combined with a slight traverse of the guide (FIG. 11) completes the fold and produces part of the edge line of the reinforcement. Simultaneously, the slot is further rotated in a counterclockwise direction to a position perpendicular to the new path of the strip. FIG. 12 shows the position of the slot after additional traversing of the guide and further rotation of roll 16. In FIG. 12 the roll 16 has advanced the folded portion of the strip from the periphery of the roll adjacent to the slot into contact with drum surface 12.

In the same way the strip is folded at the opposite end of the roll with the slot 48 being rotated in the opposite direction (clockwise rotation) at the end of the traverse. Similarly, the other guide with its corresponding strip slot will operate in the same manner as that described above to produce a second strip pattern with folds at each edge.

The apparatus of the invention provides novel means for accurately guiding and positioning one or more unitary strips on a support surface in a desired pattern. The apparatus, although particularly useful in the formation of multi-strip belts with folded edges, is also useful in the production of reinforcements in which some or all of the turns at the edges are flat and without folds. This can be accomplished by deactivating the cylinder which actuates the mechanism for rotating the guide members to fix the guide slot. Preferably, the guide is stopped with the strip slot therein parallel to the axis of the drum and perpendicular to the longitudinal axis of the reinforcement.

It will be apparent that various modifications and changes in the apparatus described in detail and shown in the drawings can be made within the scope of the invention. For example, the means for rotating the guide member can be other than the cylinder and pulley arrangements shown. Also, the location of the pulley and cylinder with respect to the guide can be changed. In addition, the pivot axis of the strip can be displaced from the center of the slot. Further, the angle of the guide slot during traversing can be changed. Also, the direction of rotation of the guides to produce the folds can be reversed. Therefore, the foregoing description and drawings are intended to illustrate preferred embodiments of the invention, and the scope of the invention is to be limited only by the following claims.

That which is claimed is:

1. Apparatus for guiding a continuous strip to a support surface including a guide member having a slot therethrough pivotably carried by a guide support housing, means for reducing the friction in the slot of said guide member, means for pivoting said guide member in said guide support housing and a roll positioned between said guide member and said support surface in contact with said support surface and extending across said support surface transversely to movement of said support surface with respect to said guide member.

2. Apparatus according to claim 1 wherein the means for pivoting said guide member includes a rotatable pulley mounted on said guide support housing and spaced from said guide member, means for rotating said pulley and means operably connecting said pulley with said guide member whereby rotation of said pulley produces a corresponding rotation of said guide member.

3. Apparatus according to claim 1 including means for periodically reciprocating said guide member transversely of said support surface.

4. Apparatus according to claim 1 wherein the means for pivoting said guide member includes a cylinder and piston.

5. Apparatus according to claim 2 wherein the means connecting said pulley and said guide member is flexible cable.

6. Apparatus according to claim 1 including means for moving said guide support housing away from said support surface.

7. Apparatus according to claim 1 including a second pivotable guide member.

8. Apparatus according to claim 7 including means for interconnecting said guide members to simultaneously control the movement thereof.

9. Apparatus according to claim 7 including means for periodically reciprocating said guide members so that they are positioned simultaneously at opposite ends of their reciprocal movement.

10. Apparatus according to claim 1 wherein said means for reducing the friction in the opening of said guide member includes a plurality of rollers.

11. Apparatus according to claim 10 including means for adjusting the spacing between said rollers.

12. Apparatus according to claim 1 wherein said support surface is a generally cylindrical surface.

13. Apparatus according to claim 1 including a second roll in contact with said first roll with the axes of said rolls substantially parallel to each other.

References Cited

UNITED STATES PATENTS

| 3,492,187 | 1/1970 | Hirtzer | 156—446 |

FOREIGN PATENTS

| 569,009 | 1/1959 | Canada | 156—446 |
| 17,549 | 1898 | Great Britain | 161—Dig. 6 |

MURRAY KATZ, Primary Examiner

J. H. NEWSOME, Assistant Examiner

U.S. Cl. X.R.

156—173, 177, 184, 187; 242—7.21, 43